(12) United States Patent
Jeong et al.

(10) Patent No.: US 10,782,243 B2
(45) Date of Patent: Sep. 22, 2020

(54) APPARATUS FOR INSPECTING WELDING TIPS OF SPOT WELDING GUNS

(71) Applicant: AUTOIT CO., LTD, Seoul (KR)

(72) Inventors: Myung Hwan Jeong, Seoul (KR); Ju Yong Jang, Daegu (KR); Hyun Hwan Jeon, Gyeongsan-si (KR)

(73) Assignee: AUTOIT CO., LTD, Seoul (KR)

( * ) Notice: Subject to any disclaimer, the term of this patent is extended or adjusted under 35 U.S.C. 154(b) by 0 days.

(21) Appl. No.: 16/466,951

(22) PCT Filed: Aug. 23, 2017

(86) PCT No.: PCT/KR2017/009214
§ 371 (c)(1),
(2) Date: Jun. 5, 2019

(87) PCT Pub. No.: WO2018/105854
PCT Pub. Date: Jun. 14, 2018

(65) Prior Publication Data
US 2020/0064273 A1 Feb. 27, 2020

(30) Foreign Application Priority Data

Dec. 5, 2016 (KR) .......................... 10-2016-0164300

(51) Int. Cl.
*H04N 9/47* (2006.01)
*G01N 21/88* (2006.01)
(Continued)

(52) U.S. Cl.
CPC ..... *G01N 21/8806* (2013.01); *G01N 21/8851* (2013.01); *H04N 5/2252* (2013.01); *H04N 5/2253* (2013.01); *H04N 5/2256* (2013.01); *G01N 21/952* (2013.01); *G01N 2021/889* (2013.01); *G01N 2201/022* (2013.01); *G01N 2201/0245* (2013.01)

(58) Field of Classification Search
CPC .................................................. H04N 5/2257
USPC ........................................................... 348/90
See application file for complete search history.

(56) References Cited

U.S. PATENT DOCUMENTS

2012/0200695 A1* 8/2012 Yamane ............. B23K 11/3063
348/90
2014/0333756 A1* 11/2014 Sogo ..................... B23K 11/115
348/90
(Continued)

FOREIGN PATENT DOCUMENTS

JP 2009-285725 A 12/2009
JP 2016-525690 A 8/2016
(Continued)

OTHER PUBLICATIONS

International Search Report dated Nov. 22, 2017 in connection with counterpart International Application No. PCT/KR2017/009214, citing the above references.

*Primary Examiner* — Fabio S Lima
(74) *Attorney, Agent, or Firm* — Hauptman Ham, LLP (57) ABSTRACT

Description according to the present disclosure relates to an apparatus for inspecting a welding tip of a spot welding gun, and more particularly, to an apparatus for inspecting a welding tip of a spot welding gun, the apparatus enabling a user to replace a camera module swiftly and conveniently.

3 Claims, 10 Drawing Sheets

(51) Int. Cl.
    *H04N 5/225*     (2006.01)
    *G01N 21/952*     (2006.01)

(56) References Cited

U.S. PATENT DOCUMENTS

2016/0193681 A1*   7/2016   Pesme .................. B23K 9/0286
                                                                         219/130.01
2017/0182605 A1*   6/2017   Rajagopalan ........ B23K 9/0282

FOREIGN PATENT DOCUMENTS

| KR | 10-2012-0096391 A | 8/2012 |
| KR | 10-1385922 B1 | 4/2014 |
| KR | 10-2016-0113792 A | 10/2016 |

\* cited by examiner

FIG. 9 ated as a single package.
APPARATUS FOR INSPECTING WELDING TIPS OF SPOT WELDING GUNS

CROSS REFERENCE TO RELATED APPLICATION

This present application is a national stage filing under 35 U.S.C. § 371 of PCT application number PCT/KR2017/009214 filed on Aug. 23, 2017 which is based upon and claims the benefit of priority to Korean Patent Application No. 10-2016-0164300 filed on Dec. 5, 2016 in the Korean Intellectual Property Office. The disclosures of the above-listed applications are hereby incorporated by reference herein in their entirety.

TECHNICAL FIELD

Exemplary embodiments according to the present disclosure relate to an apparatus for inspecting a welding tip of a spot welding gun, and more particularly, to an apparatus for inspecting a welding tip of a spot welding gun, the apparatus enabling a user to replace a camera module swiftly and conveniently.

BACKGROUND ART

Spot welding, in general, is a kind of resistance welding technique which is performed by pressurizing two or three metal boards for welding between a pair of spot welding guns, with one metal board piled onto another, and then applying currents to the spot welding guns to generate resistive heat to thereby weld the metal boards. Such spot welding, also known as point welding, is advantageous in terms of short welding time, and thus, is widely used for thin plate welding.

During spot welding, as a part of a base material remains at the tip of a spot welding gun, the spot welding gun would not be available for long-term use. To avoid this issue, a welding tip made of copper is attached to the tip of the spot welding gun for protection.

To provide high-quality welding, the state of welding tips is vital. However, after performing 100 to 200 times of welding, the end of the welding tip would be contaminated and unavailable for further use. In such case, the end of the welding tip would be polished using an auto tip dresser (ATD). After sharpening the end of the welding tip using the ATD, a cut surface of the welding tip is inspected using a welding tip inspection apparatus to determine whether impurities remain on the cut surface. If the inspection results show poor, the welding tip is transferred to the ATD by a welding tip transfer gun to polish the welding tip. Usually, the ATD and the welding tip inspection apparatus are provided in a combined single package.

Commonly known types of welding tip inspection apparatuses include inspection apparatuses including color sensors and inspection apparatuses including cameras. An inspection apparatus including a color sensor emits light from a white light-emitting diode (LED) and then measures a spectrum of the light that is reflected off a cut surface of a welding tip and then returns to thereby determine whether the welding tip is contaminated. While this type of inspection apparatus may provide rapid measurement speed, accurate measurement cannot be made due to environmental factors such as a distance to a welding tip and an angle of the welding tip.

Figure 9:
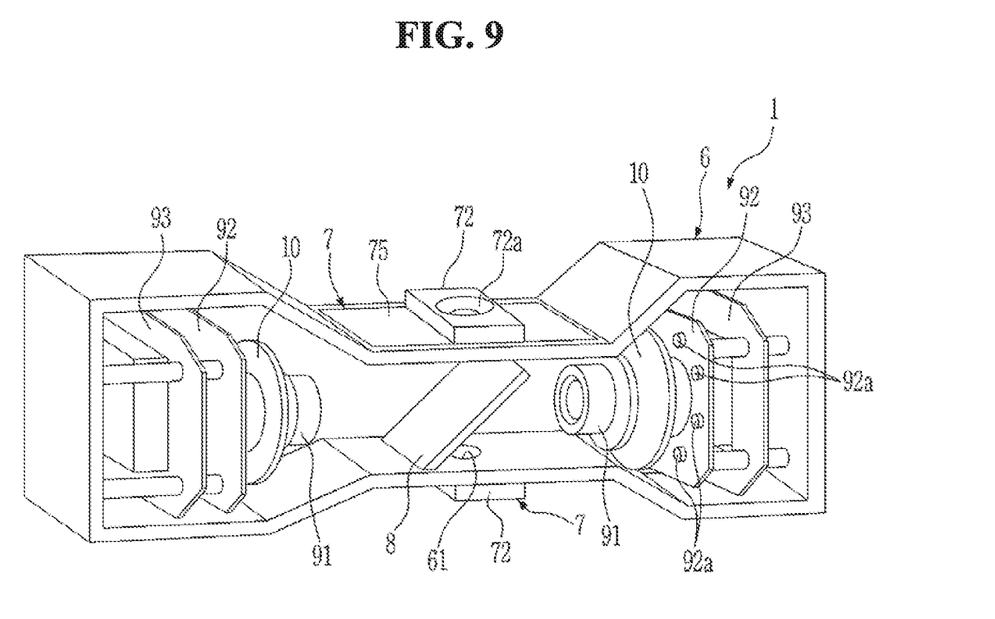
FIG. 9 is a view illustrating an apparatus for inspecting a welding tip of a spot welding gun according to related art.

An inspection apparatus including a camera determines whether a cut surface of a welding tip is contaminated based on image processing by capturing a cut surface of the welding tip using a two-dimensional (2D) camera. Korean Patent Publication No. 10-1385922 (Entitled: Electrode inspection device for spot welding) discloses that while securing a welding tip to a securing hole (72a) of a fixed plate (7), two camera modules each photograph a cut section of the welding tip projected from a mirror through reflection from the front of the welding tip as illustrated in FIG. 9. The two camera modules are provided on opposite sides facing each other and a lighting for emitting light to an inspection space is provided behind the camera modules.

However, according to Korean Patent Publication No. 10-1385922 (Entitled: Electrode inspection device for spot welding), this type of inspection apparatus has a disadvantage in that the entire apparatus needs to be disintegrated at the time of repair or replacement of the two camera modules. Moreover, since the mirror is provided between the two camera modules to face the two welding tips, in the case of impurities being stained on the surface of the mirror, images of the welding tips may not be accurately analyzed.

DISCLOSURE OF INVENTION

Problem to be Solved by the Invention

Under the circumstances, the present disclosure has been suggested to provide an apparatus for inspecting a welding tip of a spot welding gun enabling a user to conveniently process the cleaning and replacement operations of a camera module.

Additionally, the present disclosure provides an apparatus for inspecting a welding tip of a spot welding gun enabling a user to conveniently process the cleaning and replacement operations of a camera module, while preventing impurities from being stained on a mirror.

The other objectives of the present disclosure will be more clearly understood from the following detailed description of exemplary embodiments.

Means for Solving Problem

In order to achieve the aforementioned objectives, an apparatus for inspecting a welding tip of a spot welding gun according to an exemplary embodiment of the present disclosure includes: a main circuit board comprising a plurality of light sources for a camera lighting at a circumference of an inspection space, a main circuit module for analyzing a contamination level of a welding tip based on a captured image of an end of the welding tip inserted to the inspection space, a cable connection unit for connecting a cable to an external device, and a camera module connection unit for detachably connecting a camera module; a pressure plate having a first through-hole through which a welding tip to be inspected is penetrated, and a first light transmission portion through which a light reflected from the welding tip to be inspected is transmitted; a protective casing provided with an insertion portion to which the welding tip is inserted at a position corresponding to the first through-hole of the pressure plate;

a protrusion protruding from the protective casing to protect the camera module mounted in the camera module connection unit of the main circuit board, and to reflect the light reflected from the welding tip that has been transmitted through the first light transmission portion of the pressure plate; and a housing detachably coupled to the main circuit board, and provided with an insertion portion to which the circuit board mounted with the camera module is inserted at a position corresponding to the camera module connection unit of the main circuit board, the housing having a second through-hole connected to the first through-hole of the pressure plate, a second light transmission portion through which the light reflected from the welding tip is transmitted that has been emitted from the light source for a camera lighting, and a holding portion in which the pressure plate is held.

According to an exemplary embodiment of the present disclosure, the protective casing of apparatus for inspecting a welding tip of a spot welding may be detachably coupled to the housing.

According to an exemplary embodiment of the present disclosure, the apparatus may further include a center guide including a mounting portion in which the pressure plate is mounted, and a protective member for protecting the insertion portion of the protective casing through being rotated by an air cylinder when advancing forward, the protective member being detachably coupled to the housing.

According to an exemplary embodiment of the present disclosure, the apparatus may further include a display device to operate by receiving a display control signal from the main circuit module, the display control signal corresponding to results of determination on the contamination level of the welding tip.

Effect of the Invention

According one or more exemplary embodiments of the present disclosure, an apparatus for inspecting a welding tip of a spot welding gun enables a user to replace a camera module swiftly and conveniently.

Furthermore, according one or more exemplary embodiments of the present disclosure, an apparatus for inspecting a welding tip of a spot welding gun can enable a user to conveniently process the cleaning and replacement operations of a camera module, while preventing impurities from being stained on a mirror.

BEST MODE(S) FOR CARRYING OUT THE INVENTION

Advantages and features of the present disclosure and methods for achieving them will be made clear from exemplary embodiments described below in detail with reference to the accompanying drawings. The present disclosure may, however, be embodied in many different forms and should not be construed as being limited to the exemplary embodiments set forth herein. Rather, these exemplary embodiments are provided so that this disclosure will be thorough and complete, and will fully convey the scope of the disclosure to those skilled in the art.

The present disclosure is merely defined by the scope of the claims. Therefore, well-known constituent elements, operations and techniques are not described in detail in the exemplary embodiments in order to prevent the present disclosure from being obscurely interpreted. Like reference numerals refer to like elements throughout the specification.

A term that includes an ordinal number, such as 1st, 2nd, can be used to describe the various components, but the components by the terms and is not limited. The ordinal description is used only to distinguish one component from another.

Figure 1:
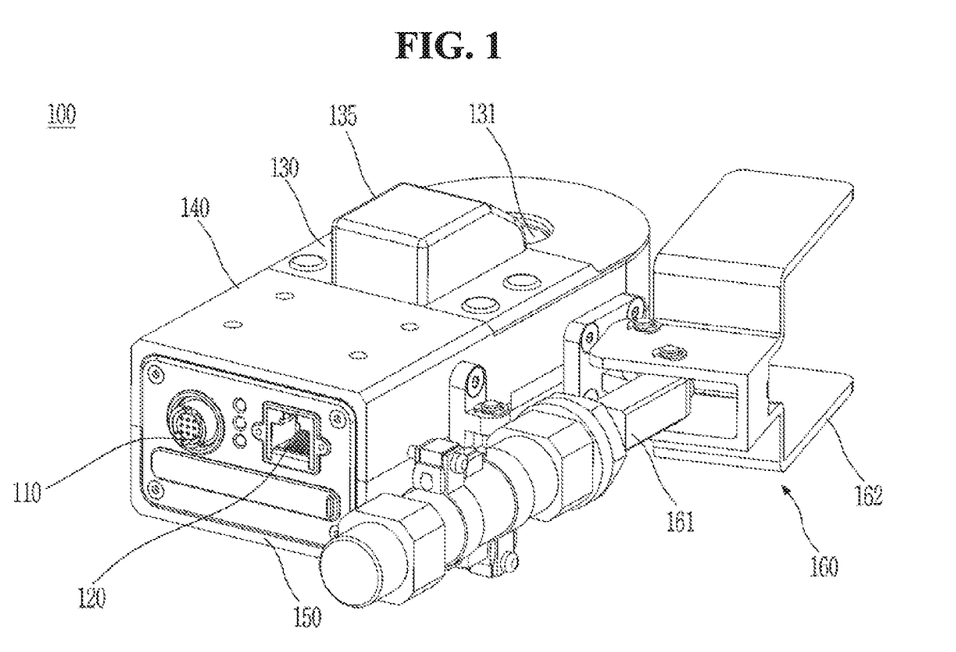
FIG. 1 is a view illustrating an apparatus for inspecting a welding tip of a spot welding gun according to an exemplary embodiment of the present disclosure.
Figure 2A:
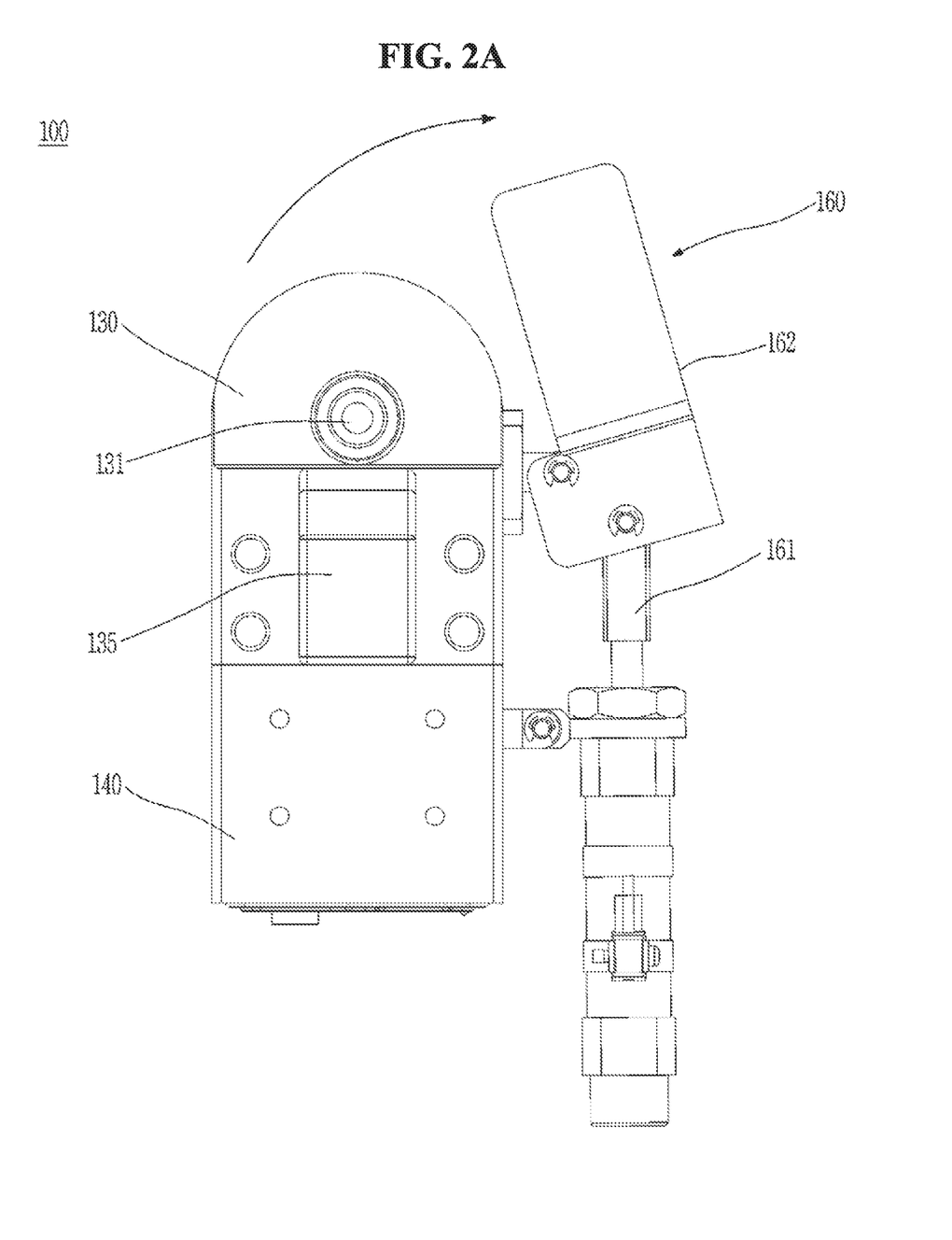
FIGS. 2A and 2B are views illustrating a protective member of an apparatus for inspecting a welding tip of a spot welding gun according to an exemplary embodiment of the present disclosure.
Figure 2B:
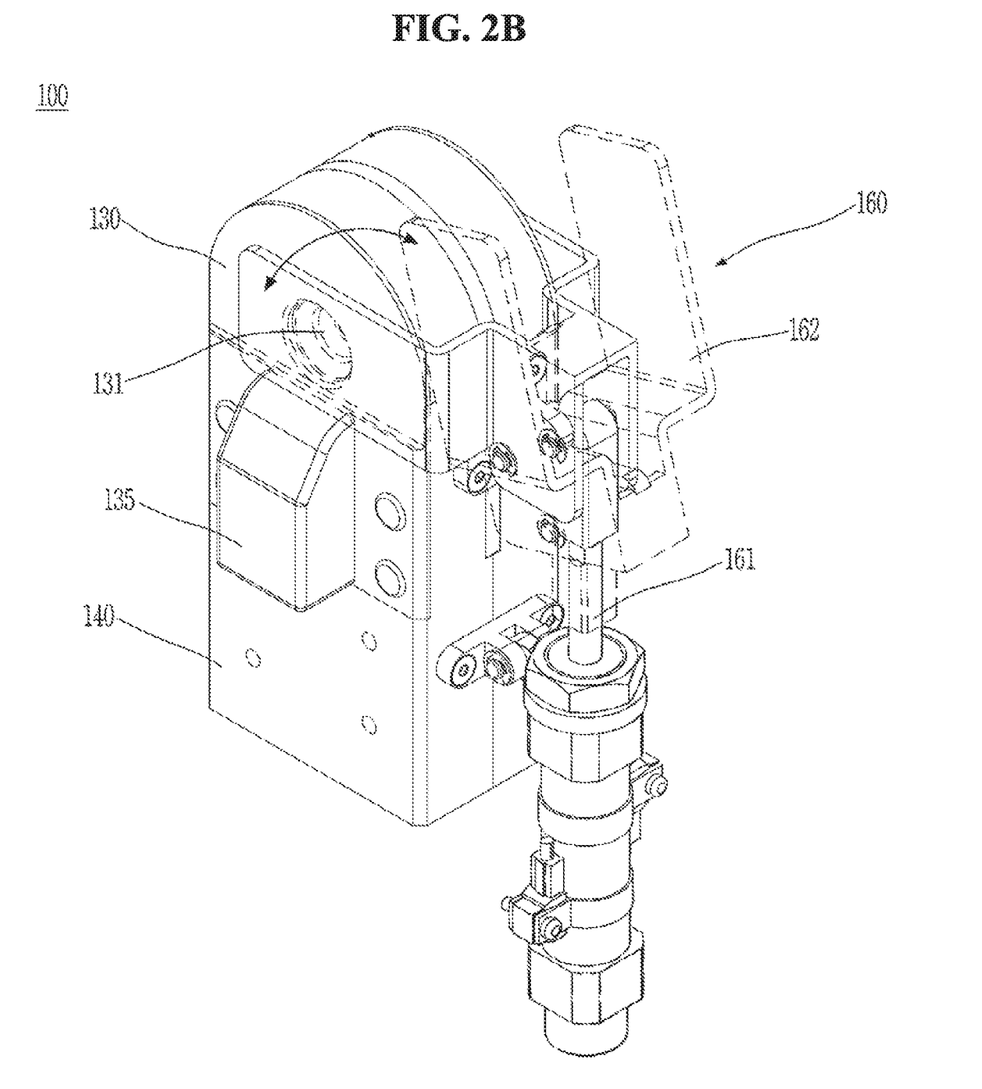
Figure 3:
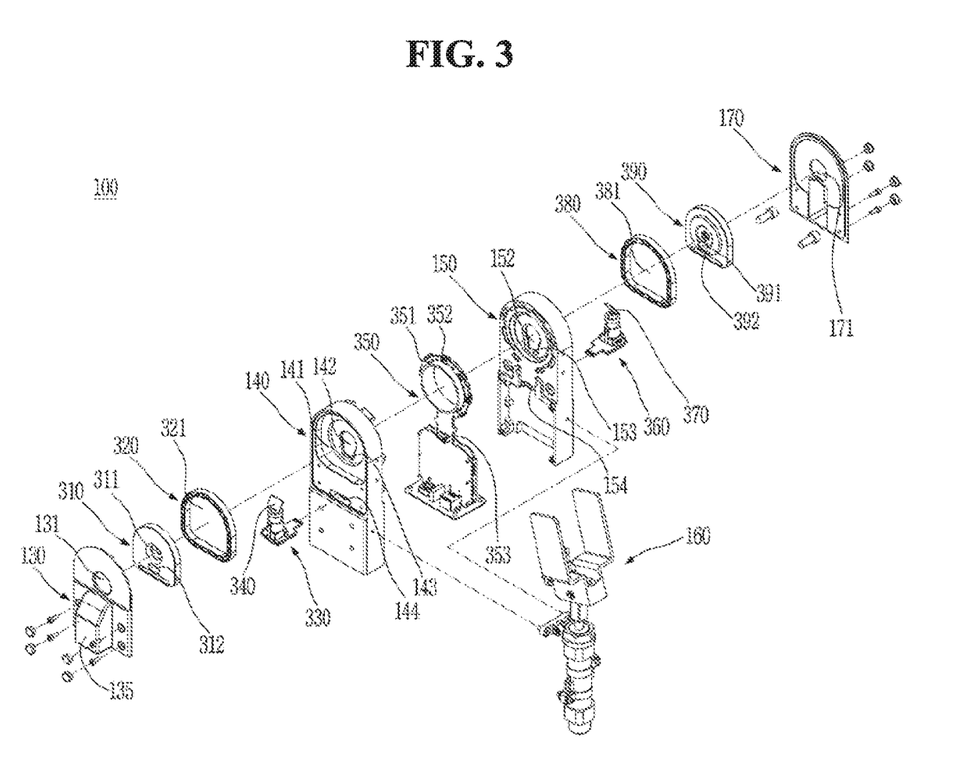
FIG. 3 is an exploded view illustrating components of an apparatus for inspecting a welding tip of a spot welding gun according to an exemplary embodiment of the present disclosure.
Figure 4:
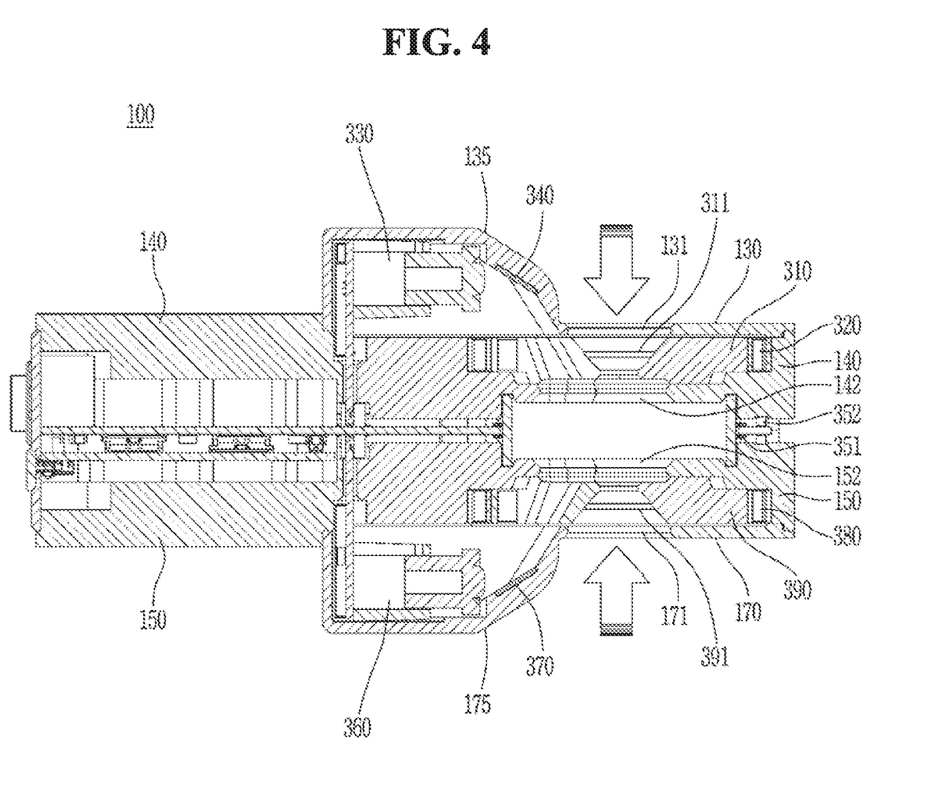
FIG. 4 is a cross-sectional view illustrating an apparatus for inspecting a welding tip of a spot welding gun according to an exemplary embodiment of the present disclosure.

FIG. 1 illustrates a view of an apparatus for inspecting a welding tip of a spot welding gun according to an exemplary embodiment of the present disclosure. FIGS. 2A and 2B illustrate views of a protective member of an apparatus for inspecting a welding tip of a spot welding gun according to an exemplary embodiment of the present disclosure. FIG. 3 illustrates an exploded view of components of an apparatus for inspecting a welding tip of a spot welding gun according to an exemplary embodiment of the present disclosure. FIG. 4 illustrates a cross-sectional view of an apparatus for inspecting a welding tip of a spot welding gun according to an exemplary embodiment of the present disclosure.

Referring to FIGS. 1, 2A, 2B, 3 and 4, an apparatus (100) for inspecting a welding tip of a spot welding gun according to an exemplary embodiment of the present disclosure includes a PLC cable port (110), an Ethernet port (120), protective casings (130, 170), an upper housing (140), a lower housing (150), and a protective member (160) for protecting from impurities infiltrating through insertion portions (131, 171) of the protective casings (130, 170).

Referring to FIGS. 2A and 2B, the protective member (160) is detachably coupled to the upper housing (140) and the lower housing (150). The protective member (160) includes a cover (162) for opening and/or closing the insertion portions (131, 1710) of the protective casings (130, 170) by a hinge member being rotated by an air cylinder (161) when advancing forward.

The apparatus (100) for inspecting a welding tip of a spot welding gun according to an exemplary embodiment of the present disclosure has protrusions (135, 175) protruding from the protective casings (130, 170) to protect camera modules (indicated by the reference numerals 330, 360 in FIG. 3) and having reflectors (indicated by the reference numerals 340, 370 in FIG. 3) mounted therein. Although the reflectors (340, 370) are depicted in FIG. 3 in front of a lens of the camera modules (330, 360) for convenience of understanding, the reflectors (340, 370) are actually mounted on an inner side of the protrusions (135, 175) as shown in FIG. 4.

Referring to FIG. 3, internal components of the apparatus for inspecting a welding tip of a spot welding gun according to an exemplary embodiment of the present disclosure include a main circuit board (350), pressure plates (310, 390) formed with first through-holes (311, 391) through which a welding tip to be inspected is penetrated, and first light transmission portions (312, 392) through which the light reflected from the welding to be inspected is transmitted, camera modules (330, 360), reflectors (340, 370), an upper housing (140), a lower housing (150) and center guides (320, 380).

The center guides (320, 380) include mounting portions (321, 381) in which the pressure plates (310, 390) are mounted. The center guides (320, 380) are made of a resilient material (such as rubber). The center guides (320, 380) serves to protect the components from being damaged even when a welding tip being transferred by a welding tip transfer gun is inserted and pressured while having an error in position by a few millimeters from a reference insertion position. The center guides (320, 380) may be manufactured, for example, by using a mold and urethane.

The upper housing (140) and the lower housing (150) are detachably coupled. The upper housing (140) includes a holding portion (141) in which the pressure plate (310) and the center guide (320) are held, a second through-hole (142) connected to the first through-hole (311) of the pressure plate (310), and a second light transmission portion (143) through which the light emitted from a light source (indicated by the reference numeral 391 in FIG. 4) for a camera lighting to be reflected off the welding tip, the second light transmission portion extending from the second through-hole (142).

The lower housing (150) includes a holding portion in which the center guide (380) is held, like the upper housing (140), a second through-hole (152) connected to the first through-hole (391) of the pressure plate (390), and a second light transmission portion (153) through which the light emitted from a light source (indicated by the reference numeral 351 in FIG. 4) for a camera lighting to be reflected off the welding tip, the second light transmission portion extending from the second through-hole (152).

Referring to FIG. 3, a main circuit board (350) includes a plurality of light sources (351) for a camera lighting at a circumference of an inspection space, and a display device (352) to operate by receiving a display control signal from a main circuit module, the display control signal corresponding to results of determination on the contamination level of the welding tip. The display device (352) includes light-emitting diodes (LEDs) having three colors, and emits a green light in the case where the results are "normal," a yellow light for "caution," and a red light for "poor," thereby enabling a user to intuitively verify the inspection results of a contamination level of the welding tip from outside the welding tip.

The main circuit board (350) includes a camera module connection unit (353) for detachably connecting a circuit board mounted with a lens module and a camera module including an image sensor. An upper housing (140) and a lower housing (150) have insertion portions (144, 154) to which the circuit board having a camera module mounted thereon is inserted at a position corresponding to the camera module connection unit (353) of the main circuit board (350). Accordingly, a user may perform replacement of the camera module in a swift and convenient manner.

Referring to FIG. 4, a welding tip is sequentially penetrated through insertion portions (131, 171) of protective casings (130, 170)→first through-holes (311, 391) of pressure plates (310, 390)→second through-holes (142, 152) of an upper housing (140) and a lower housing (150).

Protrusions (135, 175) protrude from the protective casing (130, 170) and protect camera modules (330, 360). The protrusions (135, 175) include reflectors (340, 370) provided on an inner side thereof.

Figure 5A:
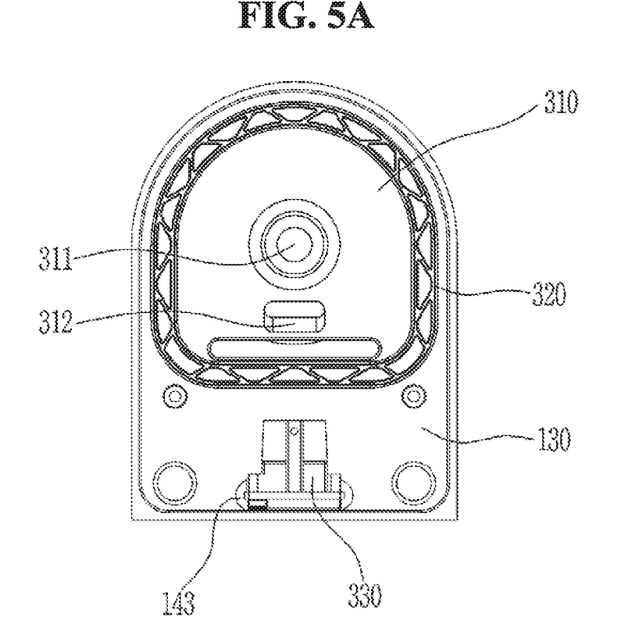
FIGS. 5A and 5B are views illustrating a displacement of a pressure plate of an apparatus for inspecting a welding tip of a spot welding gun according to an exemplary embodiment of the present disclosure.
Figure 5B:
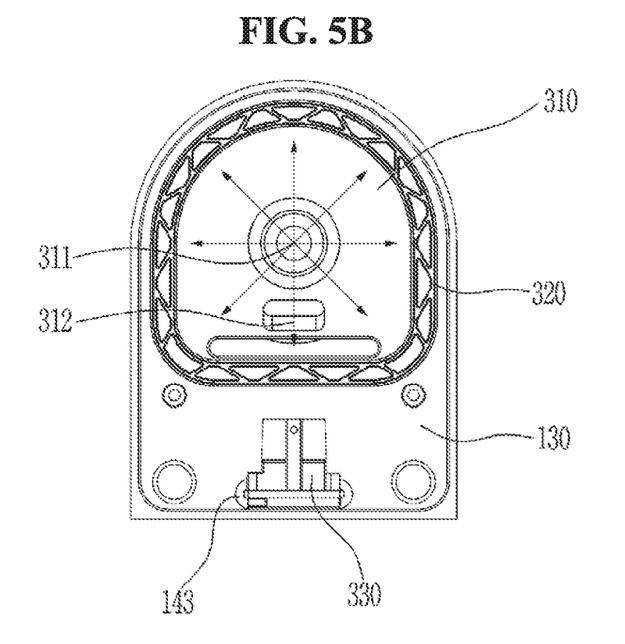

FIGS. 5A and 5B illustrate views of a displacement of a pressure plate of an apparatus for inspecting a welding tip of a spot welding gun according to an exemplary embodiment of the present disclosure. A center guide (320) has a variable distance of ±3 mm. As the center guide (320) is mounted on a pressure plate (310), when a welding tip is inserted to a first through-hole (311) of the pressure plate (310), the center guide (320) allows the position of the pressure plate (310) not to be displaced beyond the range of ±3 mm.

Figure 6:
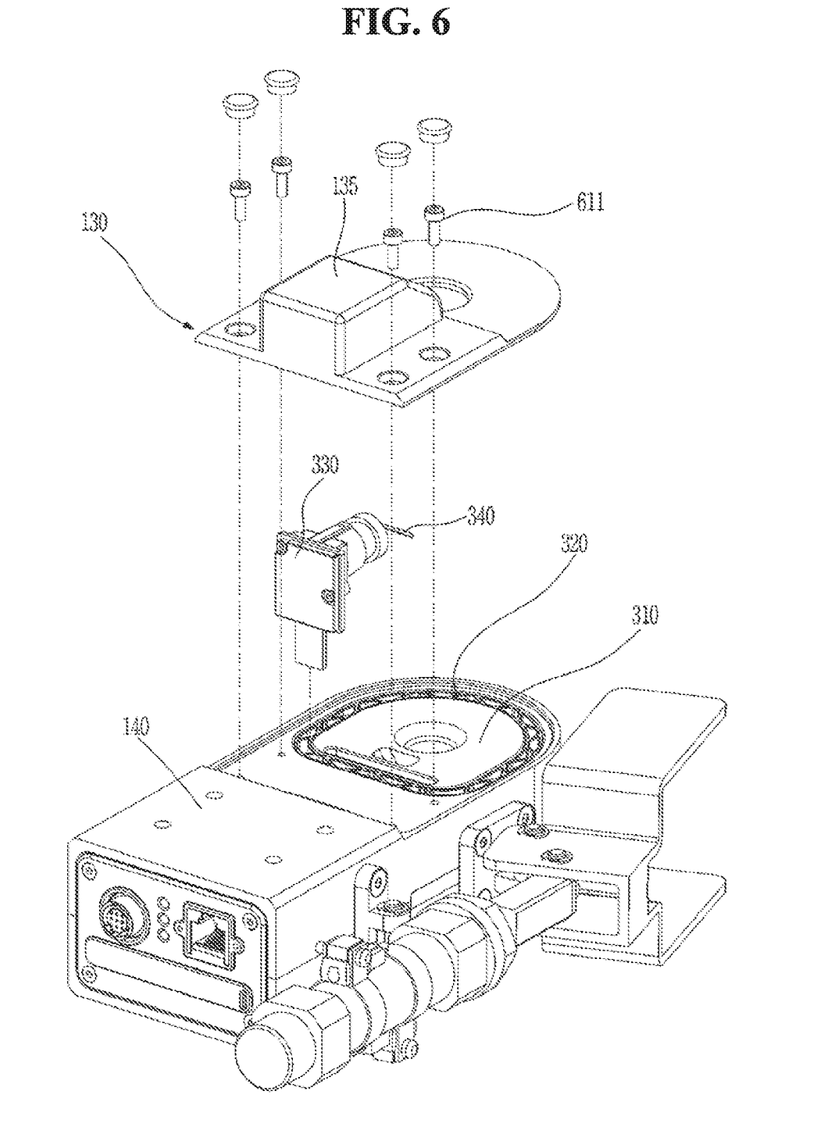
FIG. 6 is a view illustrating a process of replacing a camera module of an apparatus for inspecting a welding tip of a spot welding gun according to an exemplary embodiment of the present disclosure.

FIG. 6 is a view illustrating a process of replacing a camera module of an apparatus for inspecting a welding tip of a spot welding gun according to an exemplary embodiment of the present disclosure.

A protrusion (135) protrudes from a protective casing (130) and protects a camera module (330). The protrusion (135) includes a reflector (340) on an inner side thereof. In an upper housing (140), a pressure plate (310) and a center guide (320) are provided. A protective casing (130) and the upper housing (140) are detachably coupled to each other by a coupling member (611).

Figure 7:
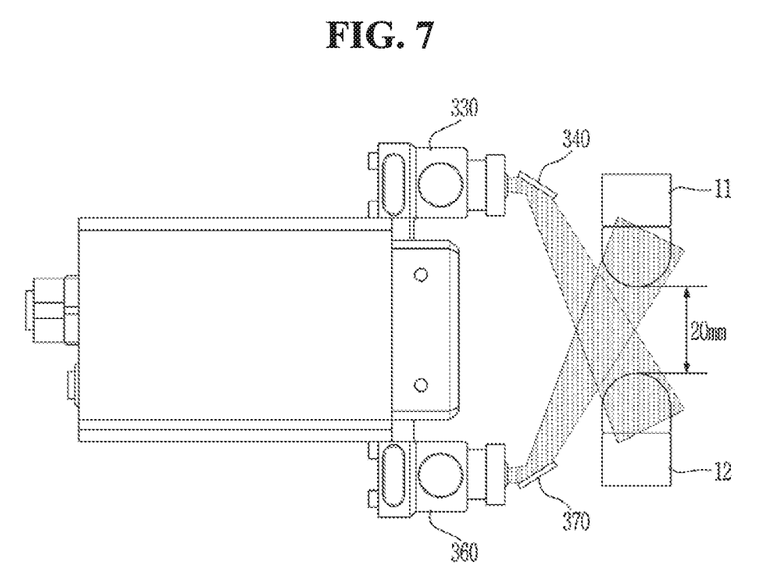
FIG. 7 is a view illustrating a process of photographing a cut surface of a welding tip using a camera module and a reflector used in an apparatus for inspecting a welding tip of a spot welding gun according to an exemplary embodiment of the present disclosure.

Referring to FIG. 7, an apparatus (100) for inspecting a welding tip of a spot welding gun according to an exemplary embodiment of the present disclosure may obtain an image of a cut surface of a pair of welding tips (11, 12) using reflectors (340, 370) and camera modules (330, 360). The apparatus (100) for inspecting a welding tip of a spot welding gun according to an exemplary embodiment of the present disclosure includes the pair of welding tips (11, 12) spaced apart by, for example, 20 mm from each other.

Figure 8:
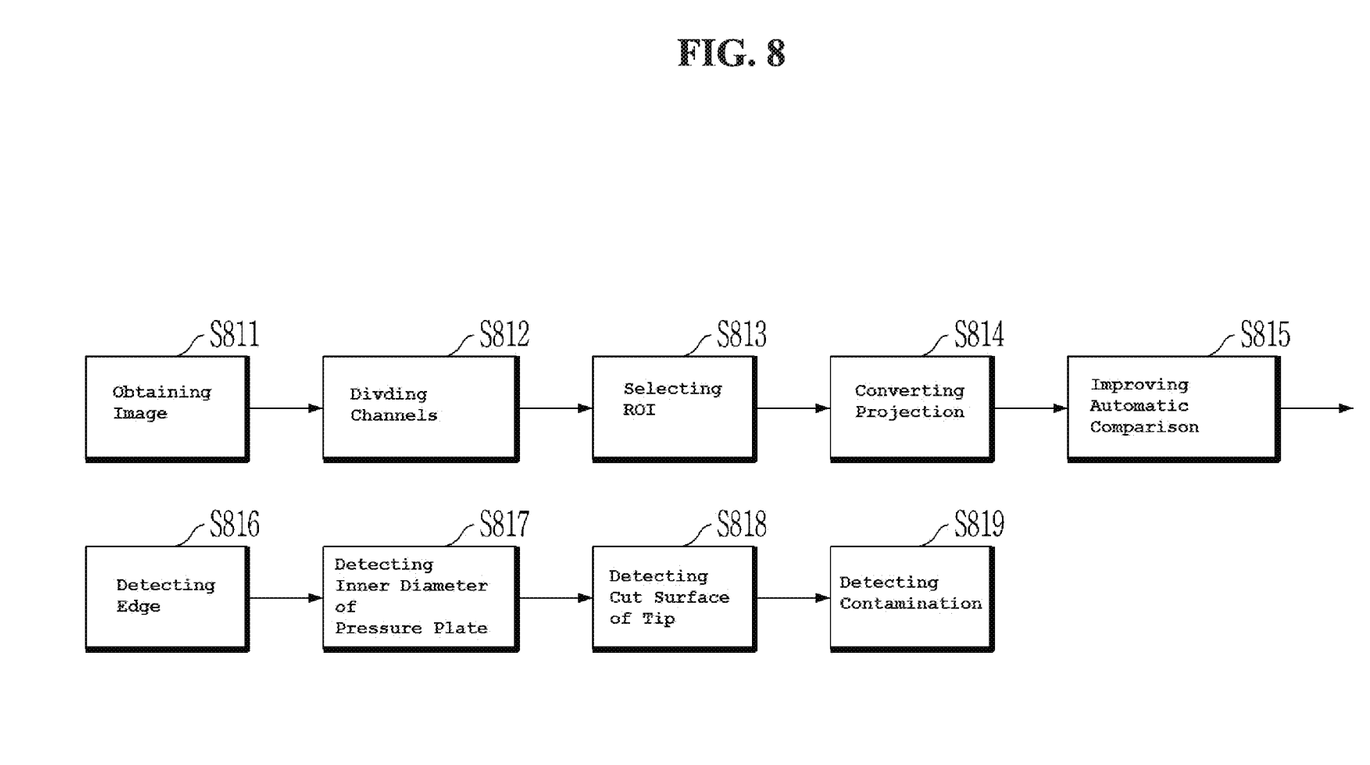
FIG. 8 is a flowchart illustrating a process of determining whether a cut surface of a welding tip is contaminated based on image processing by capturing the cut surface of the welding tip using a camera module.

Referring to FIG. 8, a process of determining whether a cut surface of a welding tip is contaminated based on image processing by capturing the cut surface of the welding tip using a camera module according to an exemplary embodiment of the present disclosure may include the obtaining of an image (S811), the dividing of channels (S812), the selecting of a region of interest (ROI) (S813), the converting of a projection (S814), the improving of automatic comparison (S815), the detecting of an edge (S816), the detecting of an inner diameter of a pressure plate (S187), the detecting of a welding tip cut surface (S818), and the detecting of contamination (S819).

The obtaining of an image (S811) includes receiving a red-green-blue (RGB) image of a cut surface of a welding tip inputted from a camera module. The inputted RGB image includes information on various colors, and thus, may be converted into a YCbCr image including information on luminance, blue color and red color in order to omit a process of reviewing information on unnecessary colors during a process of analyzing a contamination level of the welding tip.

Although the specification of the present disclosure describes that an RGB image is initially received and then converted into a YCbCr image, the present disclosure is not limited thereto. As such, a YCbCr may be received directly from the camera module.

The dividing of channels (S812) includes dividing the YCbCr image into a Y image including luminance information, a Cb image including luminance information and blue color information, and a Cr image including luminance information and red color information in order to detect a tip region based on each of the luminance information, blue color information and red color information and to detect a cut surface using only the Y image including luminance information.

The selecting of a region of interest (ROI) (S813) includes extracting a region corresponding to information on a predetermined tip color from the YCbCr image to detect a welding tip region, and designating the detected welding tip region as an ROI.

The converting of a projection (S814) includes projecting a point in a three-dimensional (3D) space onto a plane image. The improving of automatic comparison (S815) includes performing a binary operation on the image of the welding tip based on a predetermined reference value and obtaining binary data on the welding tip. For example, a region in the image of the welding tip that has a value lower than the reference value is calculated as zero, and a region in the image of the welding tip that has a value higher than the reference value may be mapped to 255 to obtain binary data on the welding tip.

The detecting of an edge (S816) may include extracting an edge of the welding tip based on the binary data on the welding tip. For example, an interface between zero and 255 may be detected based on the binary data on the welding tip to thereby extract an outer peripheral portion of the welding tip, i.e., an edge of the welding tip.

The detecting of an inner diameter of a pressure plate (S187) includes detecting a region corresponding to a first through-hole (311) of a pressure plate (indicated by reference numeral 310 in FIG. 3). The detecting of an inner diameter of a pressure plate (S187) may include detecting an ellipse based on the edge information detected in the edge detection and shape information of the welding tip region. In the case of detecting pixel coordinates for each edge from the edge image, and detecting an ellipse based on the detected pixel coordinates and the extracted shape information, an ellipse may be detected using a known Hough based ellipse detection algorithm.

The detecting of a welding tip cut surface (S818) includes detecting a plurality of ellipses in the ellipse detection, comparing a ratio between a diameter of each of the detected ellipses and a height of the detected tip region to a predetermined reference ratio to thereby determine, as the cut surface, an ellipse having a minimum error from those of the plurality of ellipses that are within a tolerance range of the reference ratio.

The detecting of contamination (S819) includes comparing color information of the respective pixels in the detected cut surface to predetermined reference color information to detect the contamination level of the cut surface. The detecting of contamination (S819) may include counting pixels and measuring a contamination level. While counting a total number of the contaminated pixels on an inner side of the edge that are detected from the detected image of the binary tip region, a black pixel having a relatively low luminance from among the pixels positioned on the inner side of the edge is detected to count the number of the detected black pixels. The contamination level is measured by calculating a contamination percentage with respect to the cut surface of the welding tip by dividing the number of counted contaminated pixels by the total number of pixels with respect to the cut surface, along with measuring the contamination level based on the level for each of the contaminated pixels.

DRAWING REFERENCE NUMERALS 11, 12: welding tip
100: apparatus for inspecting a welding tip of a spot welding gun
110: PLC cable port
120: Ethernet port
130, 170: protective casing
131, 171: insertion portion
135, 175: protrusion
140: upper housing
141: holding portion
142: second through-hole
143: second light transmission portion
144: insertion portion
150: lower housing
151: holding portion
152: second through-hole
153: second light transmission portion
154: insertion portion
160: protective member
161: air cylinder
162: cover
310, 390: pressure plate
311, 391: first through-hole
312, 392: first light transmission portion
320, 380: center guide
330, 360: camera module
340, 370: reflector
350: main circuit board
351: fight source for a camera lighting
352: display device
353: camera module connection portion

MODE(S) FOR CARRYING OUT THE INVENTION

As described in the foregoing, modes for carrying out the present disclosure are provided in an optimal way to carry out the invention.

INDUSTRIAL APPLICABILITY

Description according to the present disclosure is applicable to an apparatus for inspecting a welding tip.

The invention claimed is:
1. An apparatus for inspecting a welding tip of a spot welding gun, the apparatus comprising:
a protective casing provided with a first insertion portion to which the welding tip is inserted;
a pressure plate having a first through-hole through which the welding tip is penetrated, and a first light transmission portion through which a light reflected from the welding tip is transmitted;
a center guide including a mounting portion in which the pressure plate is mounted;
a housing having a second through-hole coupled to the first through-hole of the pressure plate, a second light transmission portion through which the light reflected from the welding tip is transmitted, and a holding portion in which the pressure plate is held, wherein the housing is configured by an upper housing and a lower housing detachably coupled to the upper housing;

a circuit board comprising:
  a plurality of light sources installed around an inspection space perpendicular to an axis passing through the first insertion portion of the protective case and the first through-hole of the pressure plate and the second through-hole of the housing;
  a circuit module configured to analyze a contamination level of the welding tip based on a captured image of an end of the welding tip inserted to the inspection space;
  a camera module connection unit having a camera module and configured to capture the captured image of the end of the welding tip; and
  an indicator configured to receive the analyzed contamination level from the circuit module and output information corresponding to the analyzed contamination level; and
a protrusion protruding from the protective casing to protect the camera module mounted in the circuit board, and having a reflector configured to reflect, to the camera module, the light reflected from the welding tip that has been transmitted through, in order, the second light transmission portion of the housing and the first light transmission portion of the pressure plate,
wherein
  the housing is provided with a second insertion portion to which the circuit board having the camera module mounted thereon is inserted at a position corresponding to the camera module connection unit of the circuit board,
  the protective casing is detachably coupled to the housing, and
  the center guide is made of a resilient material.

2. The apparatus according to claim 1, further comprising a protective member detachably coupled to the housing, and configured to protect the insertion portion of the protective casing through being rotated by an air cylinder when advancing forward.

3. The apparatus according to claim 1, wherein the circuit board further comprises a display device configured to receive a display control signal from the circuit module and display the display control signal, the display control signal corresponding to the analyzed contamination level of the welding tip.

* * * * *